United States Patent [19]
Midorikawa et al.

[11] Patent Number: 5,862,176
[45] Date of Patent: Jan. 19, 1999

[54] DATA TRANSFER PROCESSING SYSTEM ACHIEVING HIGH SPEED TRANSFER OF CONTINUOUSLY UPDATED/RENEWED DATA USING PRE-RENEWAL AND POST-RENEWAL INFORMATION

[75] Inventors: Hideyo Midorikawa; Hitoshi Matsubara, both of Kawasaki; Yoichi Nishiyama; Yasuhide Yamamoto, both of Tokyo, all of Japan

[73] Assignee: Fujitsu Limited, Kanagawa, Japan

[21] Appl. No.: 933,087

[22] Filed: Sep. 18, 1997

Related U.S. Application Data

[63] Continuation of Ser. No. 203,779, Mar. 1, 1994, abandoned.

[30] Foreign Application Priority Data

Mar. 1, 1993 [JP] Japan ................................ 5-040077

[51] Int. Cl.⁶ .............................. H04B 1/38; G06F 9/445
[52] U.S. Cl. .................... 375/220; 375/219; 395/200.72; 395/653
[58] Field of Search ................................ 375/219, 220, 375/222; 395/200.3, 200.68, 200.58, 200.59, 200.72, 653, 821, 841, 843, 885; 370/278, 282–287, 288

[56] References Cited

U.S. PATENT DOCUMENTS

| | | | |
|---|---|---|---|
| 3,571,505 | 3/1971 | Mounts | 348/416 |
| 3,900,834 | 8/1975 | Casey et al. | 340/172.5 |
| 4,486,853 | 12/1984 | Parsons | 364/900 |
| 4,648,036 | 3/1987 | Gallant | 364/300 |
| 4,745,559 | 5/1988 | Willis et al. | 364/514 |
| 5,045,848 | 9/1991 | Fascenda | 340/825.26 |
| 5,173,688 | 12/1992 | Deluca et al. | 340/825.44 |
| 5,258,999 | 11/1993 | Wernimont et al. | 375/220 |
| 5,270,922 | 12/1993 | Higgins | 364/408 |
| 5,327,551 | 7/1994 | Kaneko | 395/575 |
| 5,339,392 | 8/1994 | Risberg et al. | 395/161 |
| 5,410,302 | 4/1995 | Dulaney, III et al. | 340/825.44 |

FOREIGN PATENT DOCUMENTS

| | | |
|---|---|---|
| 1-002726 | 1/1989 | Japan . |
| 1-243142 | 9/1989 | Japan . |

*Primary Examiner*—Edward L. Coles
*Assistant Examiner*—Madeleiine Av Nguyen
*Attorney, Agent, or Firm*—Staas & Halsey

[57] ABSTRACT

A data transfer processing system constructed so that a transmission side system transfers continuously renewed data information disposed in a prescribed data pattern to a reception side system, wherein the transmission side system is provided with a functional part for specifying records containing the data information remaining as is as valid data even after renewal and a functional part for transferring pre-renewal and post-renewal disposition information of the specified records to the reception side system and transferring the records changed by the renewal to the reception side system in accordance with a prescribed order and wherein the reception side system is provided with a functional part for invalidating records other than the records which the transferred pre-renewal disposition information indicates, a functional part for rearranging the records not invalidated at locations indicated by the transferred post-renewal disposition information, and a functional part for writing the transferred records in empty disposition locations in accordance with a prescribed order.

11 Claims, 17 Drawing Sheets

Fig. 3

| SELLING | | | BUYING | | |
|---|---|---|---|---|---|
| 144.55 | 30 | 1 | 140.70 | 20 | 1 |
| 144.60 | 70 | 3 | 140.55 | 80 | 4 |
| 144.65 | 20 | 2 | 140.50 | 30 | 1 |
| 144.70 | 10 | 1 | 140.40 | 10 | 1 |
| 144.75 | 20 | 1 | 140.20 | 10 | 1 |

PRICE — AMOUNT — PARTY

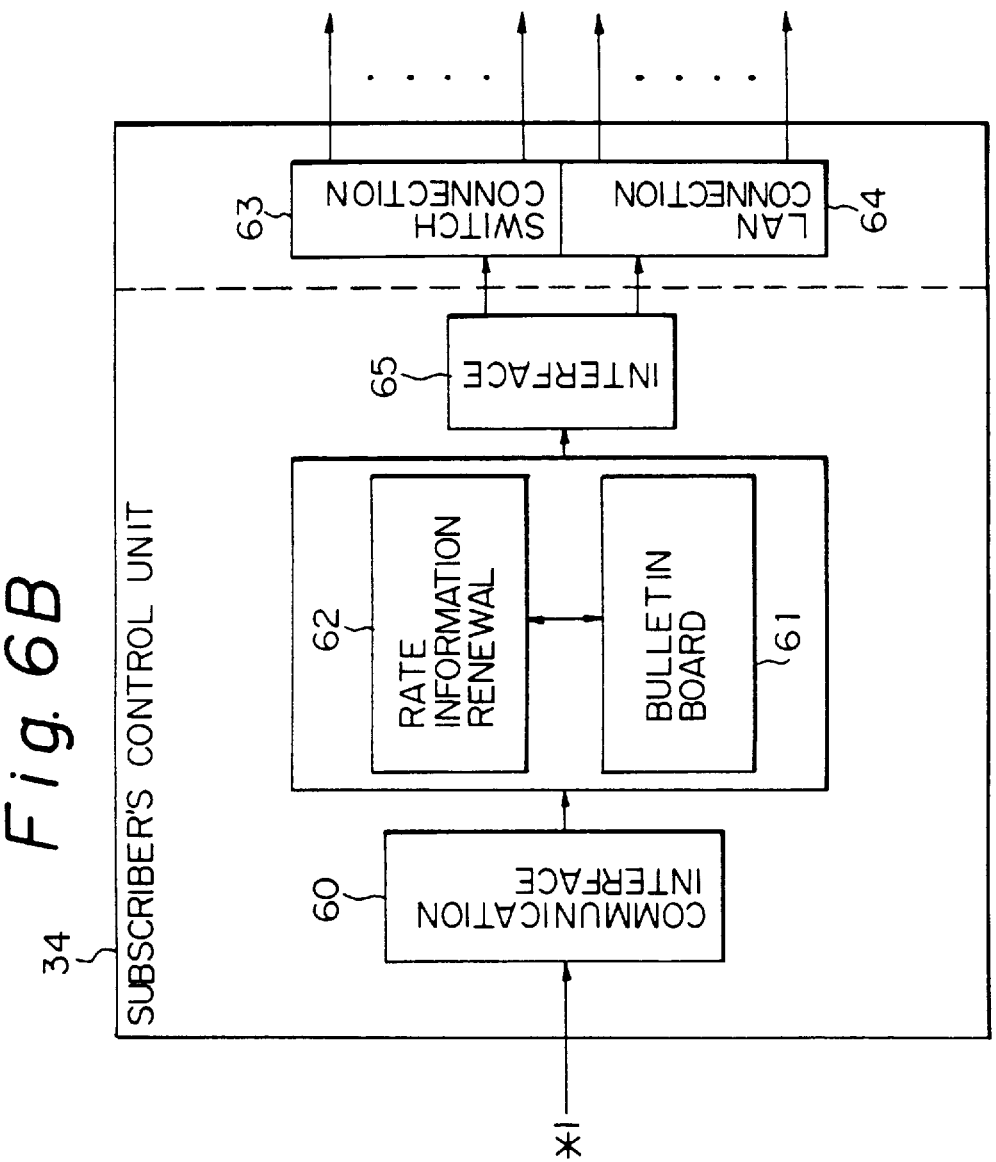

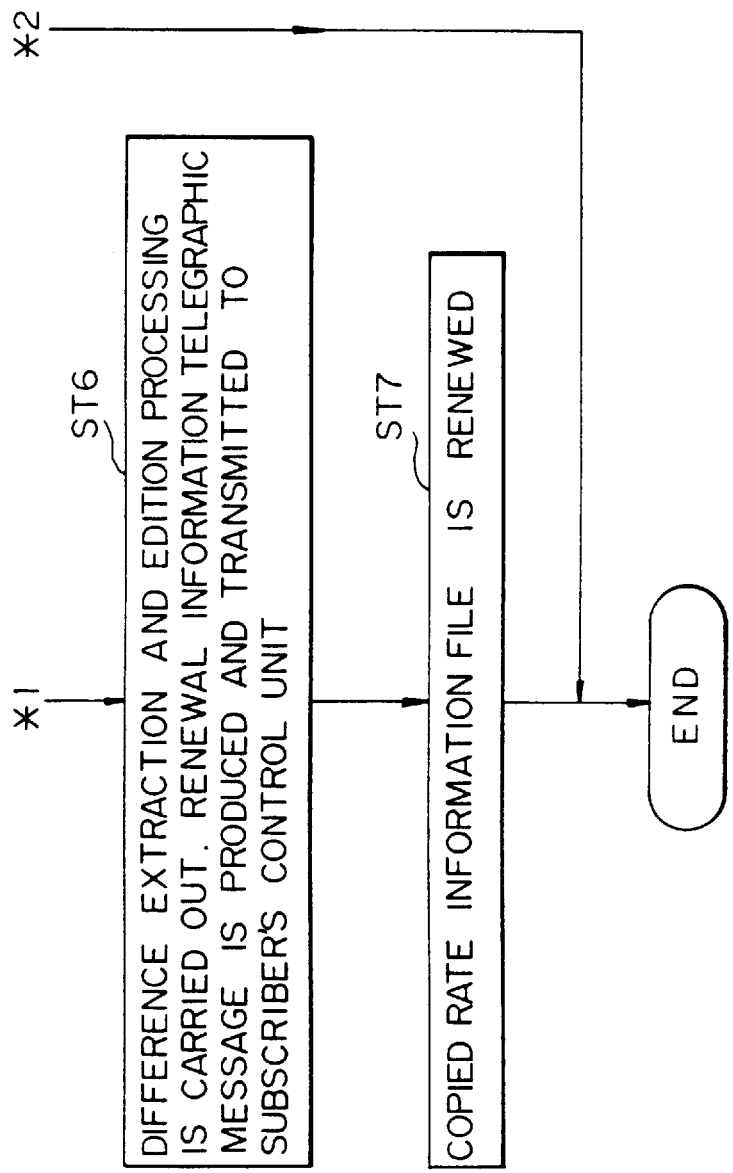

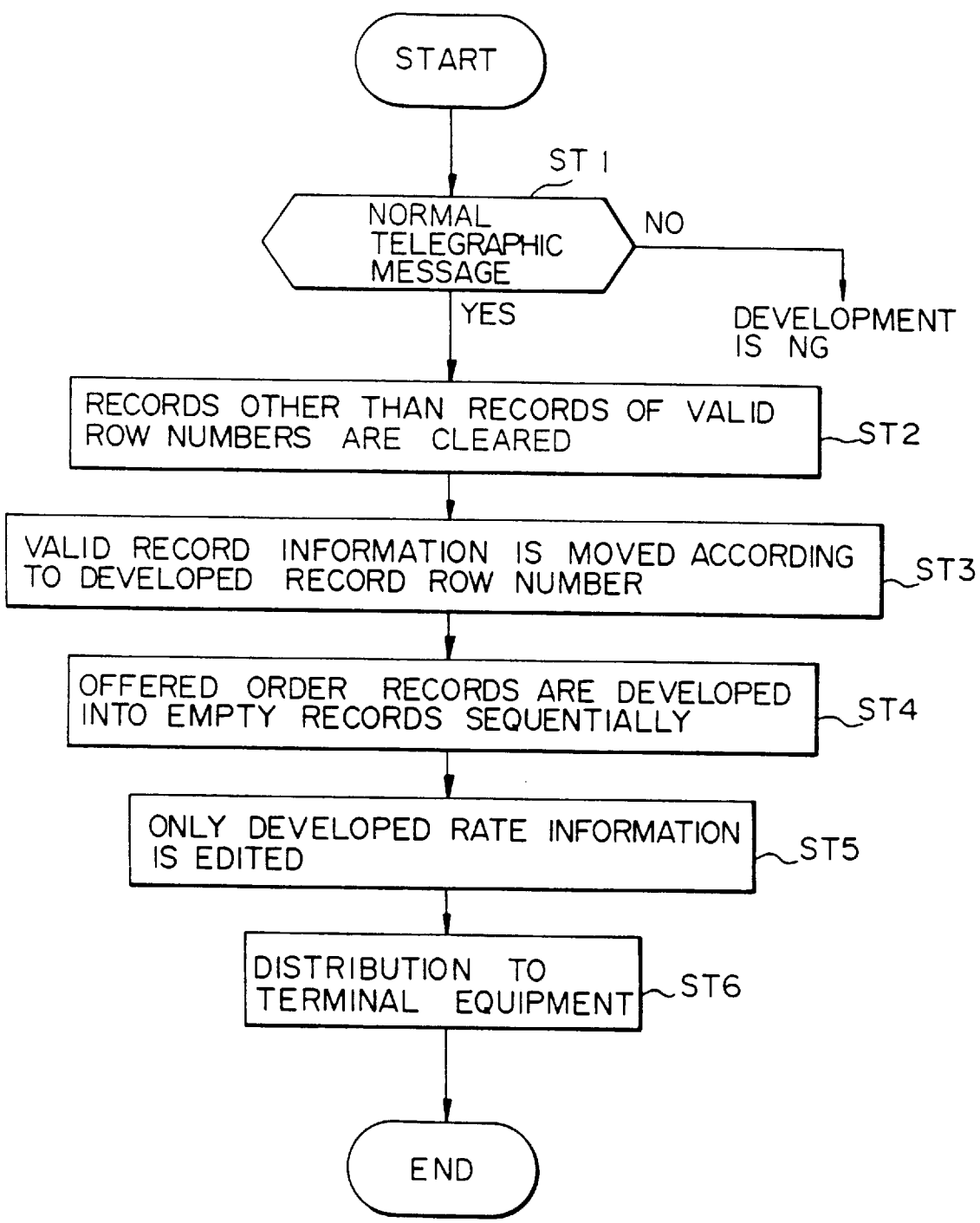

Fig. 10

| CLASSIFICATION OF MARKET | CLASSIFICATION OF SELLING AND BUYING | ROW NUMBER OF VALID RECORD | ROW NUMBER OF DEVELOPED RECORD | INSERTED RECORD-1 | ... | INSERTED RECORD-n |

Fig. 11

| CLASSIFICATION OF MARKET | CLASSIFICATION OF SELLING AND BUYING | INSERTED RECORD-1 | INSERTED RECORD-2 | ..... | INSERTED RECORD-5 |
|---|---|---|---|---|---|

DATA TRANSFER PROCESSING SYSTEM ACHIEVING HIGH SPEED TRANSFER OF CONTINUOUSLY UPDATED/RENEWED DATA USING PRE-RENEWAL AND POST-RENEWAL INFORMATION

This application is a continuation of application Ser. No. 08/203,779, filed Mar. 1, 1994, now abandoned.

BACKGROUND OF THE INVENTION

1. Field of the Invention

The present invention relates to a data transfer processing system constructed so that a transmission side system transfers continuously renewed or update data information disposed in a prescribed data pattern to the reception side system, more particularly relates to a data transfer processing system which achieves high speed transfer of renewal or update data information.

In the field of data processing, sometimes processing is performed so that a transmission side system periodically transmits continuously renewed data information disposed in a prescribed data pattern to a reception side system. For example, in a dealing system handling foreign exchange, exchange transactions are realized by the host system transmitting constantly fluctuating rate information to the terminals in the dealing rooms.

In such a system, it is necessary to increase the system effectiveness by the high speed transfer of data information from the transmission side system to the reception side system.

2. Description of the Related art

In a data transfer processing system constructed so that the transmission side system transfers continuously renewed data information disposed in a prescribed data pattern to the reception side system, conventionally the transmission side system has sent all the renewed data information as is to the reception side system.

That is, the transmission side system has transferred the new present data information as is to the reception side system without considering the previous data information which had been sent to the reception side system.

In this related art, however, all the data information has to be sent each time, so there was the problem that the transfer of the data information took time. Therefore, there were the serious problems of a heavy load exerted on the transmission line and obstruction of exchange transactions in dealing systems.

SUMMARY OF THE INVENTION

The present invention was made in consideration of the above circumstances and has as its object the provision of a data transfer processing system constructed so that the transmission side system transfers continuously renewed data information disposed in a prescribed data pattern to the reception side system which achieves high speed transfer of continuously renewed data information.

To attain the above object, the present invention provides a data transfer processing system constructed so that the transmission side system transfers continuously renewed data information disposed in a prescribed data pattern to the reception side system, wherein the transmission side system is provided with a functional part for specifying records containing the data information remaining as is as valid data even after renewal and a functional part for transferring pre-renewal and post-renewal disposition information of the specified records to the reception side system and transfers the records changed by the renewal to the reception side system in accordance with a prescribed order and wherein the reception side system is provided with a functional part for invalidating records other than the records which the transferred pre-renewal disposition information indicates, a functional part for rearranging the records not invalidated at locations indicated by the transferred post-renewal disposition information, and a functional part for writing the transferred records in empty disposition locations in accordance with a prescribed order.

BRIEF DESCRIPTION OF THE DRAWINGS

The above object and features of the present invention will be more apparent from the following description of the preferred embodiments with reference to the accompanying drawings, wherein:

FIG. 3 is a view showing an example of the display of rate information,

FIGS. 6A and 6B are functional block diagrams of a host system and a subscriber control unit, FIGS. 7A, 7B, and 7C show an embodiment of the flow of processing executed by a process for extracting the difference in rate information, FIG. 9 shows an embodiment of the flow of processing executed by a process for rewewing rate information, FIG. 10 is a view of an example of a telegraphic message of renewal information, FIG. 11 is a view of an example of a telegraphic message for use in an initializing process.

DESCRIPTION OF THE PREFERRED EMBODIMENTS

Before describing the embodiments of the present invention, the related art and the problems therein will be first described with reference to the related figures.

Figure 1:
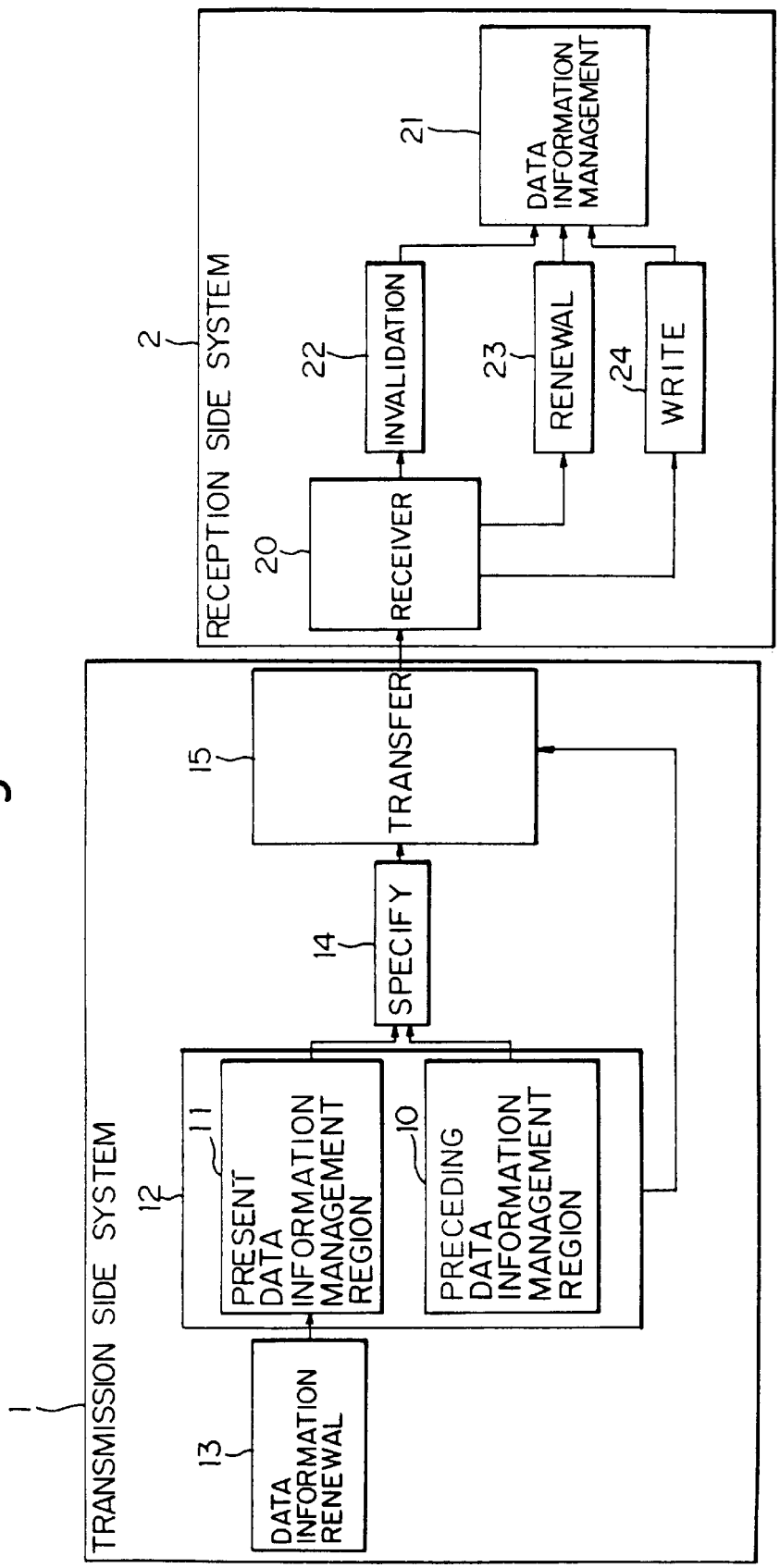
FIG. 1 is a view of the basic constitution of the present invention.

FIG. 1 illustrates the basic constitution of the present invention.

In FIG. 1, 1 is a transmission side system and 2 is a reception side system. The transmission side system 1 performs processing so as to transfer continuously renewed data information disposed in a prescribed data pattern to the reception side system 2.

The transmission side system 1 is provided with a data information management means 12 including a preceding data information management region 10 and a present data information management region 11, a data information renewal means 13, a specifying means 14, and a transfer means 15.

The prior data information management region 10 manages the data information which had been transferred to the reception side system 2 at the preceding transfer cycle. The present data information management region 11 manages the data information to be transferred to the reception side system 2 in the present transfer cycle. The data information renewal means 13 renews data information to be transferred to the reception side system 2. The specifying means 14 specifies the records remaining as valid data even after the present renewal out of the data information transferred at the preceding transfer cycle or specifies the records to become invalid data after the present renewal.

The transfer means 15 transfers the pre-renewal disposition information of the records specified by the specifying means 14 to the reception side system 2. At this time, in addition to the pre-renewal disposition information, discrimination information indicating if the records specified by the specifying means 14 are valid data or invalid data is sometimes transferred to the reception side system 2. Further, the post-renewal disposition information of the records remaining as is as valid data is transferred to the reception side system 2. Further, the records changed by the renewal are transferred to the reception side system 2 in accordance with a prescribed order.

On the other hand, the reception side system 2 is provided with a receiver means 20, a data information management means 21, an invalidating means 22, a changing means 23, and a writing means 24.

The receiver means 20 receives the transferred data from the transmission side system 1. The data information management means 21 manages the data information transferred from the transmission side system 1. The invalidating means 22 invalidates the records other than the records indicated by the disposition information when pre-renewal disposition information is transferred from the transfer means 15. Alternatively, it invalidates the records indicated by the disposition information when pre-renewal disposition information of invalid data is transferred from the transfer means 15. The changing means 23 rearranges the records not invalidated by the invalidating means 22 at the disposition locations indicated by the post-renewal disposition information transferred from the transfer means 15. The writing means 24 writes the records transferred from the transfer means 15 at empty disposition locations in accordance with a prescribed order.

The mode of operation is as follows.

I) In the present invention, the specifying means 14 of the transmission side system 1 compares the pre-renewal and post-renewal data information to specify the records to remain as is as valid data even after renewal. When it does this, the transfer means 15 transfers the pre-renewal disposition information and the post-renewal disposition information of the records to remain as is as valid data to the reception side system 2 in accordance with a predetermined format and, further, transfers the records changed by the renewal to the reception side system 2 in accordance with a prescribed order.

When the above-mentioned transfer of data is received, the invalidating means 22 of the reception side system 2 invalidates the records other than the records indicated by the pre-renewal disposition information notified from the transmission side system out of the records of data information managed in the data information management means 21. Next, the changing means 23 rearranges the records not invalidated by the invalidating means 22 at disposition locations indicated by the notified post-renewal disposition information. Then, the writing means 24 writes the transferred records in empty disposition locations in accordance with a prescribed order.

By this, the latest data information renewed by the transmission side system 1 is registered in the data information management means 21 of the reception side system 2.

II) Further, as a means opposite to that of the above I), in the present invention, the specifying means 14 of the transmission side system 1 compares the pre-renewal and post-renewal data inforamtion and specifies the records which will become invalid data after the renewal. When this happens, the transfer means 15, for example, transfers the pre-renewal disposition information of the records to become invalid data and the post-renewal disposition information of the records to remain as is as valid data to the reception side system 2. Next, the records changed by the renewal are transferred to the reception side system 2 in accordance with a prescribed order.

When the above-mentioned transfer of data is received, the invalidating means 22 of the reception side system 2 invalidates the records indicated by the pre-renewal disposition information notified from the transmission side system out of the records of the data information managed in the data information management means 21. Next, the changing means 23 rearranges the records not invalidated by the invalidating means 22 at the disposition locations indicated by the notified post-renewal disposition information. Then, the writing means 24 writes the transferred records in empty disposition locations in a prescribed order.

By this, the latest data information renewed by the transmission side system 1 is registered in the data information management means 21 of the reception side system 2.

III) Further, in the present invention, the specifying means 14 of the transmission side system 1 compares the pre-renewal and post-renewal data information, specifies the records to remain as is as valid data after the renewal and the records to become invalid data after the renewal, and determines which of the records is smaller in number. When this happens, the transfer means 15 for example transfers the pre-renewal disposition information of the records determined to be fewer in number and the discrimination information indicating if the records are valid data or invalid data to the reception side system 2 in accordance with a predetermined frame format. Further, it transfers the post-renewal disposition information of the records remaining as valid data to the reception side system 2, then transfers the records changed by the renewal to the reception side system 2 in accordance with a prescribed order.

When the above-mentioned transfer of data is received, when pre-renewal disposition information having discrimination information indicating valid data is notified, the invalidating means 2 of the reception side system 2 invalidates the records other than the records indicated by the disposition information out of the records of the data information managed in the data information management means 21. Alternatively, when pre-renewal disposition information having the discrimination information indicating the invalid data is notified, it invalidates the records indicated by the disposition information out of the records of the data information managed in the data information management means 21. Then, the changing means 23 rearranges the records not invalidated by the invalidating means 22 at disposition locations indicated by the notified post-renewal disposition information. Then, the writing means 24 writes the transferred records in empty disposition locations in the prescribed order.

Due to this, the latest data information renewed by the transmission side system 1 is registered in the data information management means 21 of the reception side system 2.

In this way, according to the present invention, when continuously renewed data information disposed in a predetermined pattern is transferred from a transmission side system 1 to a reception side system 2, it is no longer neessary to transfer all the records of the data information, so the amount of data transferred is tremendously reduced and therefore it becomes possible to transfer data information at a high speed.

Below, the present invention will be described in detail in accordance with an embodiment of application to an electronic dealing system handling foreign exchange.

Figure 2:
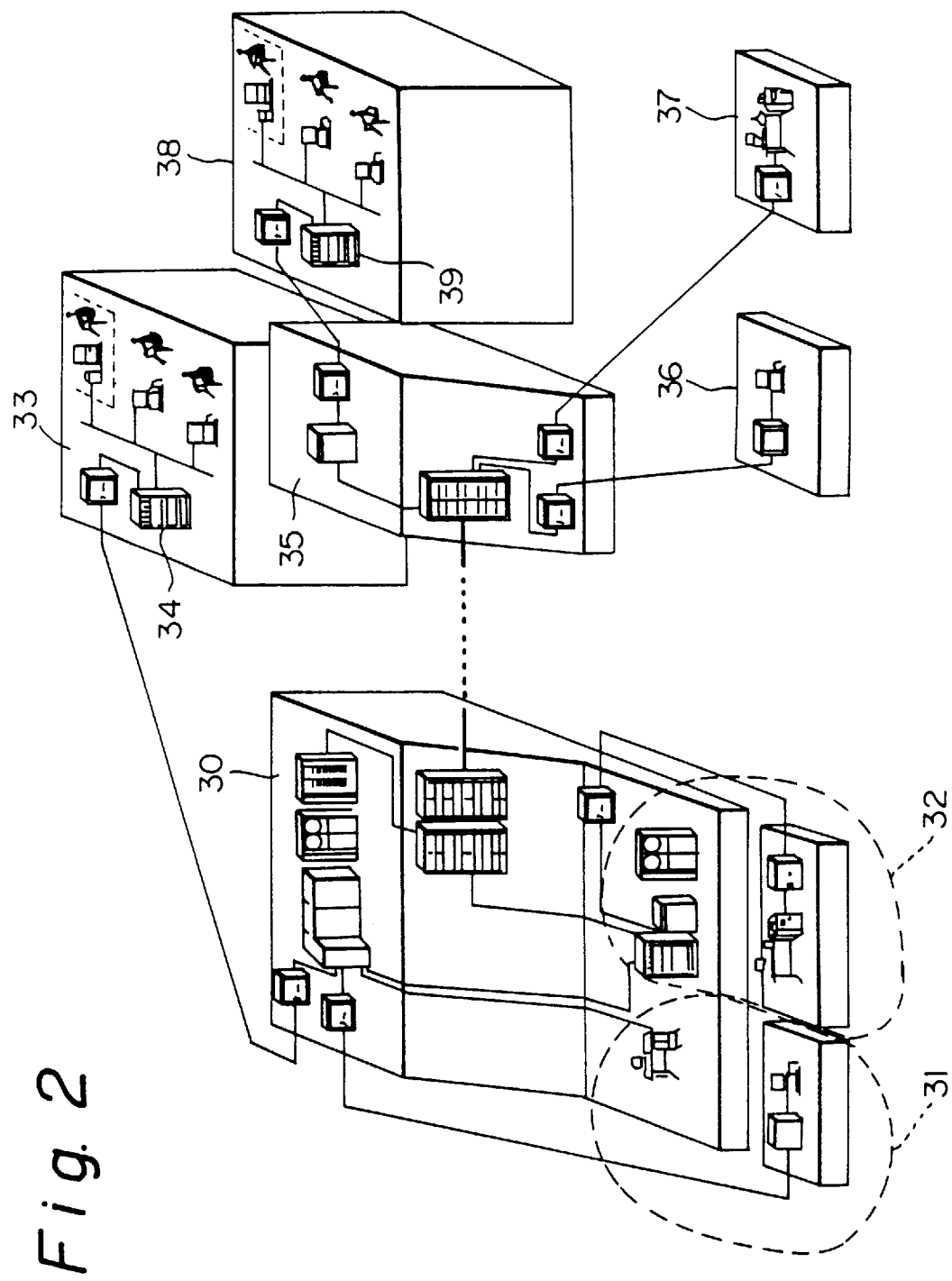
FIG. 2 is a view of the actual constitution of a dealing system.

FIG. 2 illustrates the actual constitution of an electronic dealing system handling foreign exchange.

In FIG. 2, 30 is a host system, which is constructed to manage information on requests for buying and selling foreign exchange issued from customers. Matching processing is performed on the information on buying and selling requests so as to aid the establishment of transactions of foreign exchange. Reference numeral 31 is a supervisory system connected to the host system 30 which supervises the operation of the host system 30 etc. Reference numeral 32 is a charging system connected to the host system 30 which processes service fees etc. for established transactions. Reference numeral 33 is a customer system connected to the host system 30 which executes interactive processing with the customers. Reference numeral 34 is a subscriber control unit provided in the customer system 33 which supports the terminals under the customer system 33.

Reference numeral 35 is a subsystem established overseas which supports the host system 30. Reference numeral 36 is a supervisory system connected to the subsystem 35 which supervises the state of operation of the host system etc. Reference numeral 37 is a charging system connected to the subsystem 35 which processes service fees etc. for established transactions. Reference numeral 38 is a customer system connected to the subsystem 35 which executes interactive processing with the customers. Reference numeral 39 is a subscriber control unit provided in the customer system 38 which supports terminals under the customer system 38.

The host system 30 is constructed to manage information on transaction orders placed by order side customers so as to assist the establishment of transactions for buying and selling foreign exchange. Information on requests for transactions is displayed on the display screen of terminals in the customer systems 33 and 38.

Figure 4:
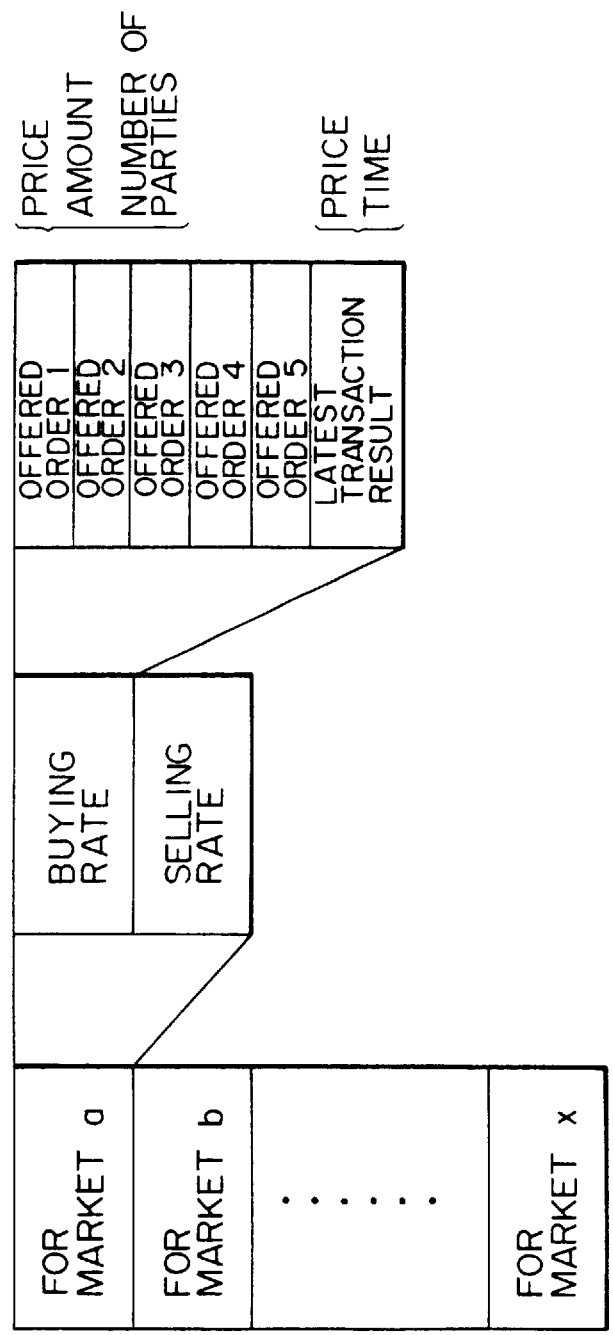
FIG. 4 is a view explaining the rate information managed by a host system.

FIG. 3 illustrates an example of the display of rate information presented to customers. This rate information has a five-line structure comprised of five records. Here, the "price" in the figure shows the exchange rate of "US$1= 140.20 yen", the "amount" shows the amount of the transaction (1 amount=US$1 million), and the "party" shows the number of customers offering that price. To facilitate transactions, the offers are arranged in the order of the best rate down. The host system 30 internally manages the rate information, comprised of the buying rate and selling rate, for each market, as shown in FIG. 4, so as to enable display processing of the rate information. The market a may be for the dollar versus the yen, while the market b may be for the mark versus the yen.

Figure 5A:
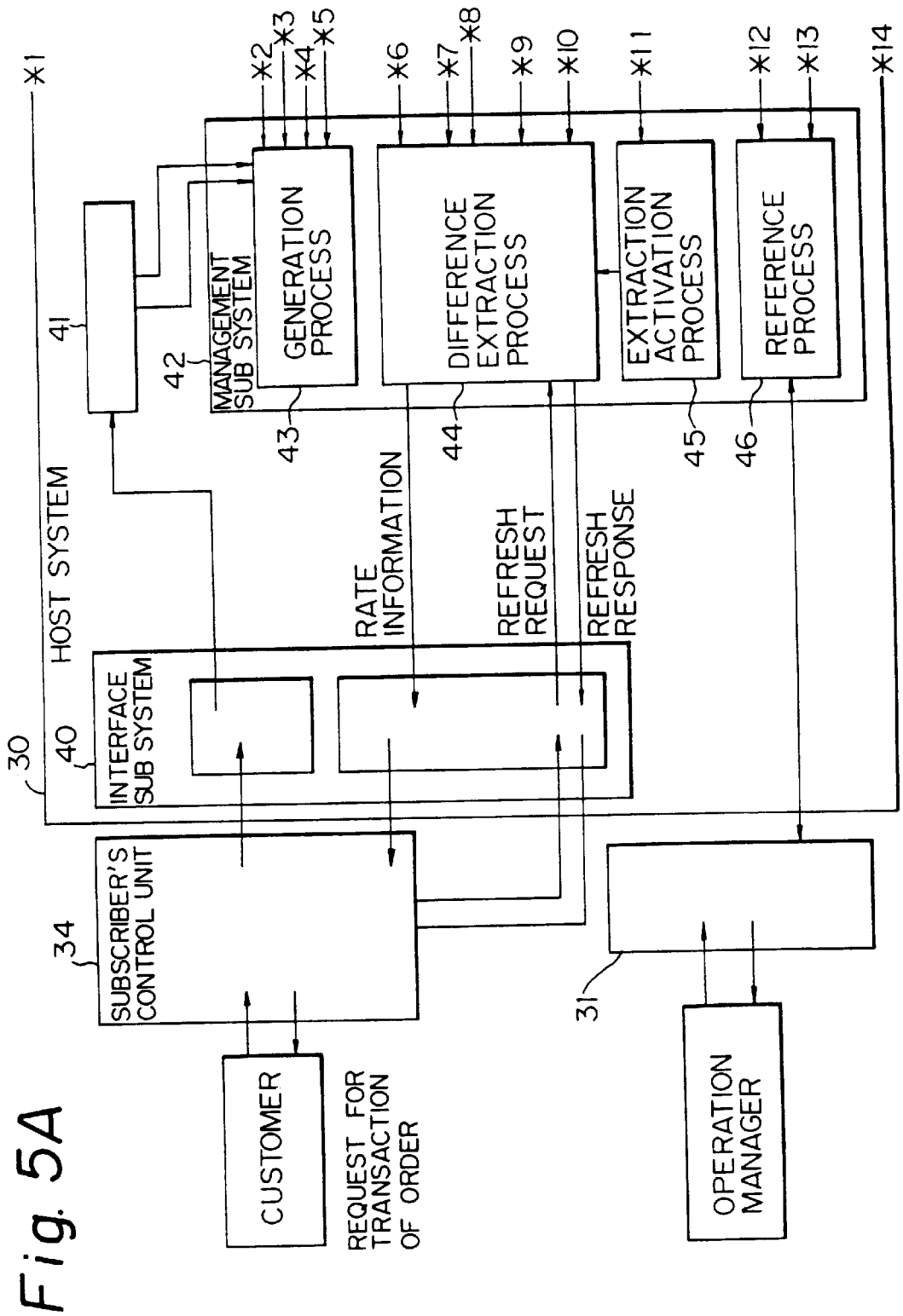
FIGS. 5A and 5B are functional block diagrams of the host system.
Figure 5B:
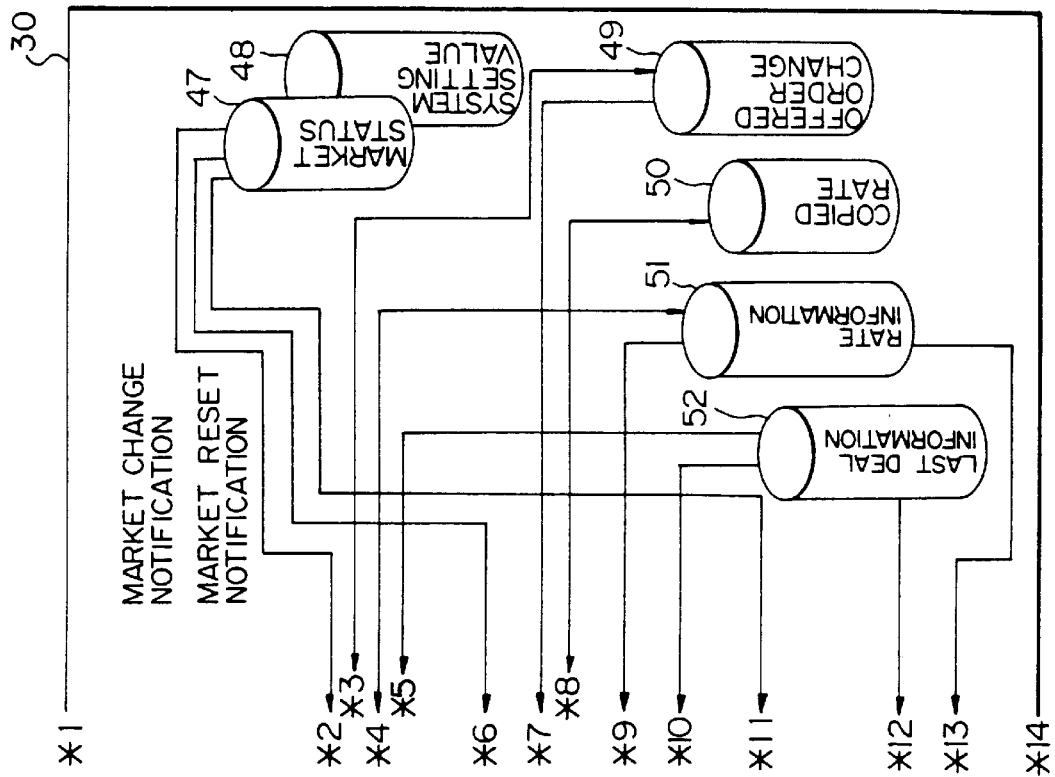

FIGS. 5A and 5B are detailed functional block diagrams of the host system 30. Here, 31 is the above-mentioned supervisory system, while 34 is the above-mentioned subscriber control unit.

As shown in the figure, the host system 30 is provided with a communication interface subsystem 40 handling the communication interface processing with the subscriber control unit 34, a rate type market subsystem 41 for executing processing for transactions of foreign exchange by applying matching processing to the information on requests for transactions of foreign exchange, a rate type information management subsystem 42 for managing the rate information, which fluctuates along with the establishment of transactions of foreign exchange, a rate information generation process 43 for generating rate information when the market changes, a rate information difference extraction process 44 developed in the rate type information management subsystem 42 for preparing the renewal information telegraphic messages required for processing for renewal of rate information managed by the subscriber control unit 34, a difference extraction activation process 45 developed in the rate type information management subsystem 42 for activating the rate information difference extraction process 44 at, for example, 2 second periods, and a rate information reference process 46 developed in the rate type information management subsystem 42 for executing processing to refer to rate information etc. in response to requests from the supervisory system 31.

Further, the host system 30 is provided with a market status file 47 for managing the information on the market status, a system setting file 48 for managing the system settings, an offered order change frequency file 49 for managing a frequency (allocated to each market) incremented each time there is an inquiry on a transaction, a copied rate file 50 for managing the rate information at the time of the preceding processing cycle (time of processing cycle 2 seconds before), a rate information file 51 for managing the rate information at the time of the present processing cycle, and a last deal file 52 for managing information on the last deal.

Figure 6A:
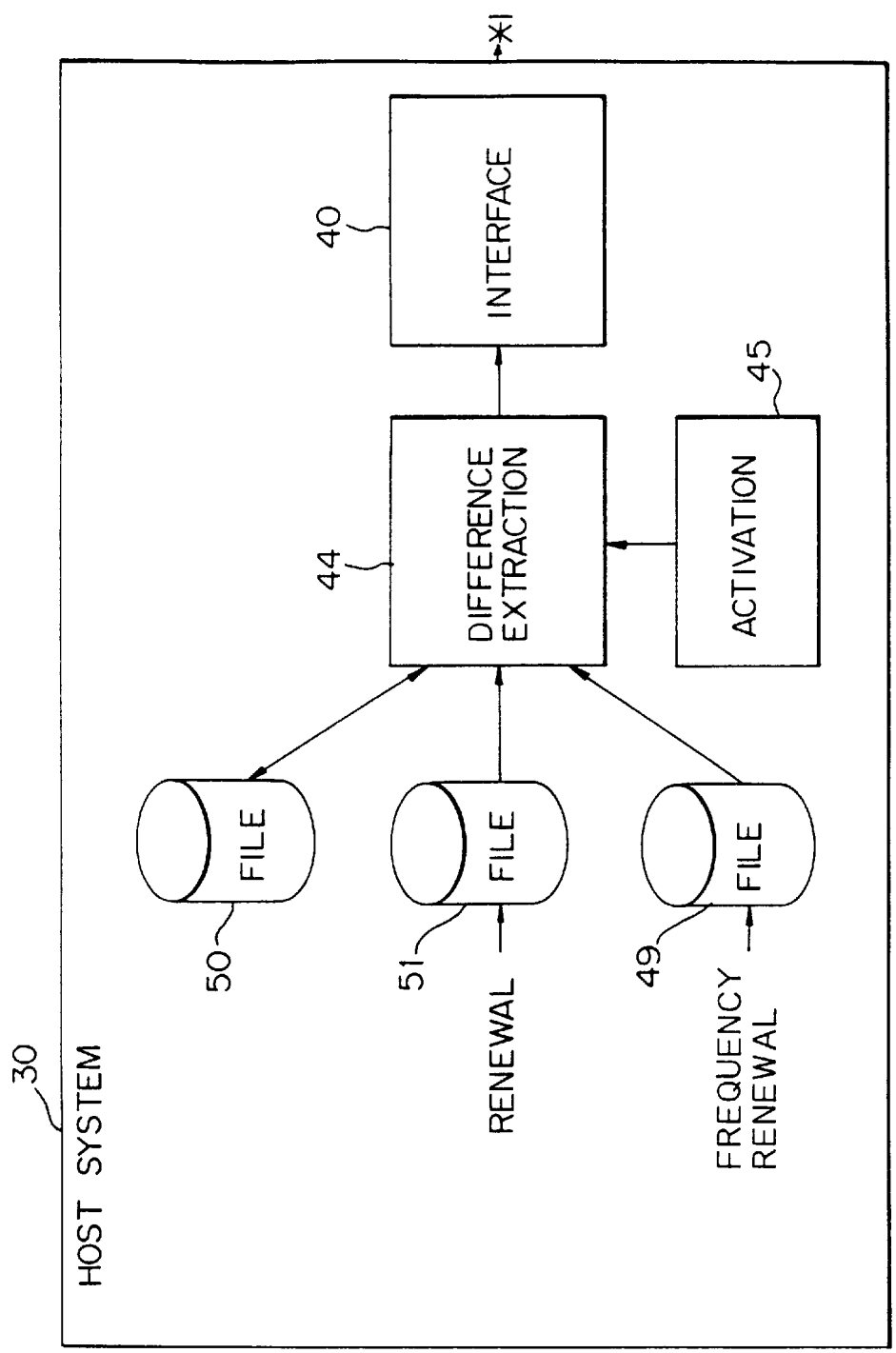

As explained with reference to FIG. 1, the present invention provides a novel data transfer processing system for transfer from a transmission side system 1 to a reception side system 2. When applied to an electronic dealing system as in this embodiment, it is used for transferring rate information produced by the host system 30, such as shown in FIG. 3, to the subscriber control unit 34. FIGS. 6A and 6B illustrate functional blocks in the host system 30 constituted in this which are of particular relevance to the present invention and functional blocks in the subscriber control unit 34 which are of particular relevance to the present invention. Here, elements the same as those explained with reference to FIGS. 5A and 5B are given the same reference numerals.

In FIGS. 6A and 6B, 60 is a communication interface function provided by the subscriber control unit 34 which handles the communication interface processing with the host system 30. Reference numeral 61 is a rate information bulletin board provided in the subscriber control unit 34 which manages rate information transferred from the host system 30. Reference numeral 62 is a rate information renewal process provided in the subscriber control unit 34 which creates the latest rate information from the rate information listed by the rate information bulletin board and the renewal information telegraphic message transferred from the rate information difference extraction process 44 of the host system 30 and lists the same on the rate information bulletin board 61.

Reference numeral 63 is a video switch connection unit provided in the subscriber control unit 34 which executes interface processing with the video terminals connected to the same. Reference numeral 64 is a customer LAN connection adaptor provided in the subscriber control unit 34 which executes interface processing with the connected digital terminals. Reference numeral 65 is a communication interface function provided by the subscriber control unit 34 which handles the communication interface processing with the video switch connection unit 63/customer LAN connection adaptor 64.

Note that while omitted in FIGS. 6A and 6B, the host system 30 has a broadcasting communication function with respect to a plurality of connected subscriber control units 34. The individual subscriber control units 34 have a broadcasting communication function with respect to a plurality of connected terminals.

Figure 7A:
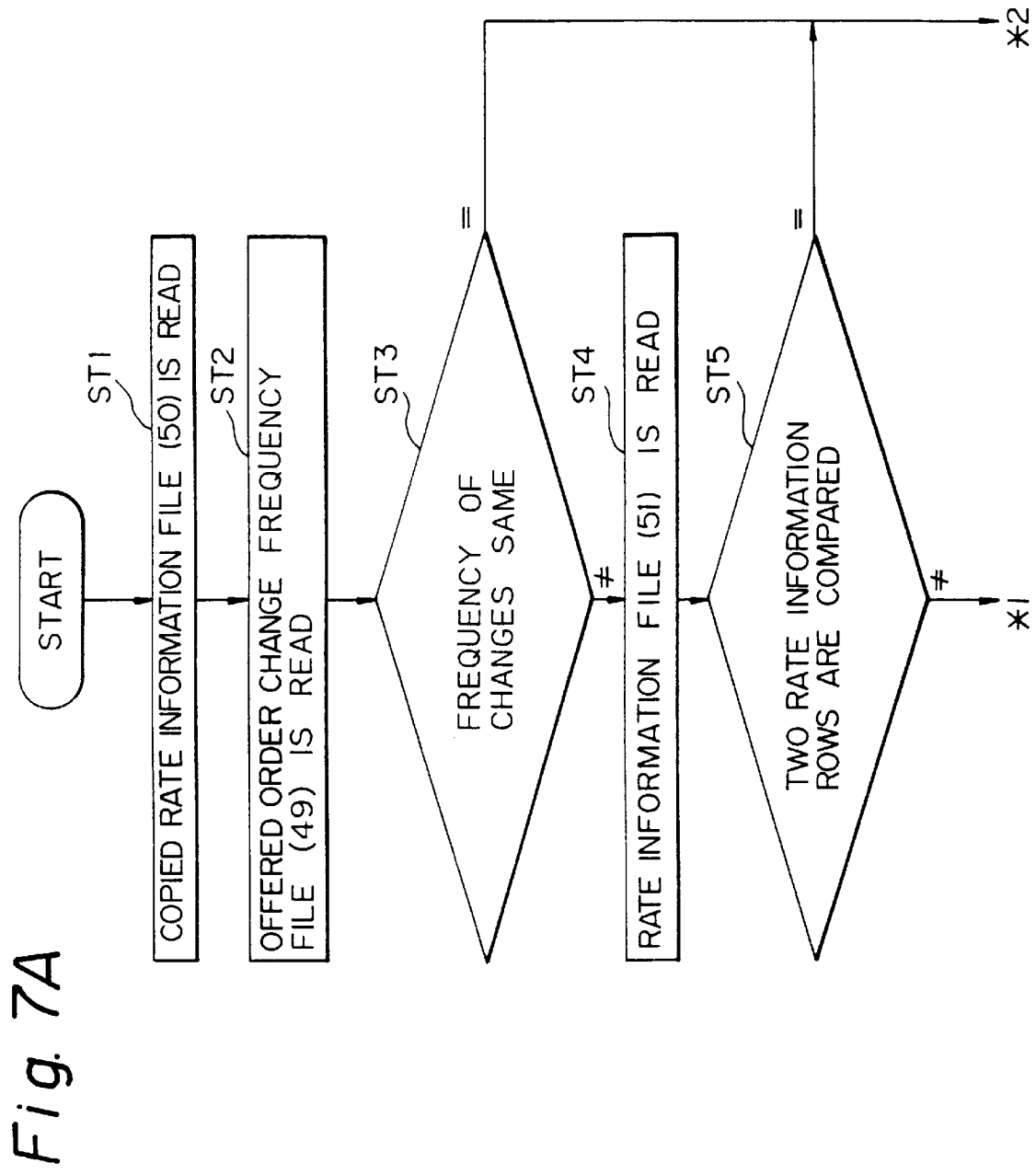
Figure 7C:
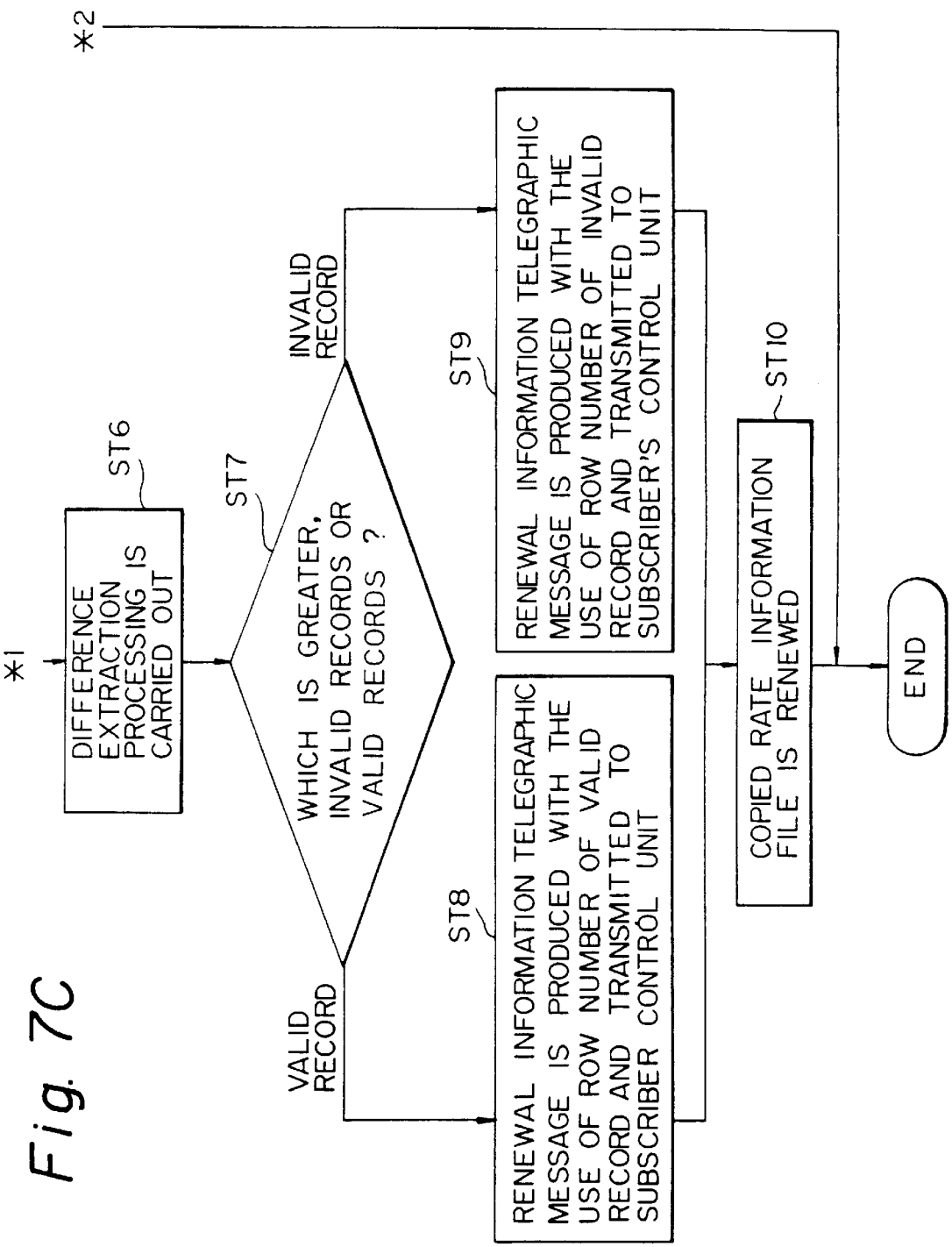
Figure 8A:
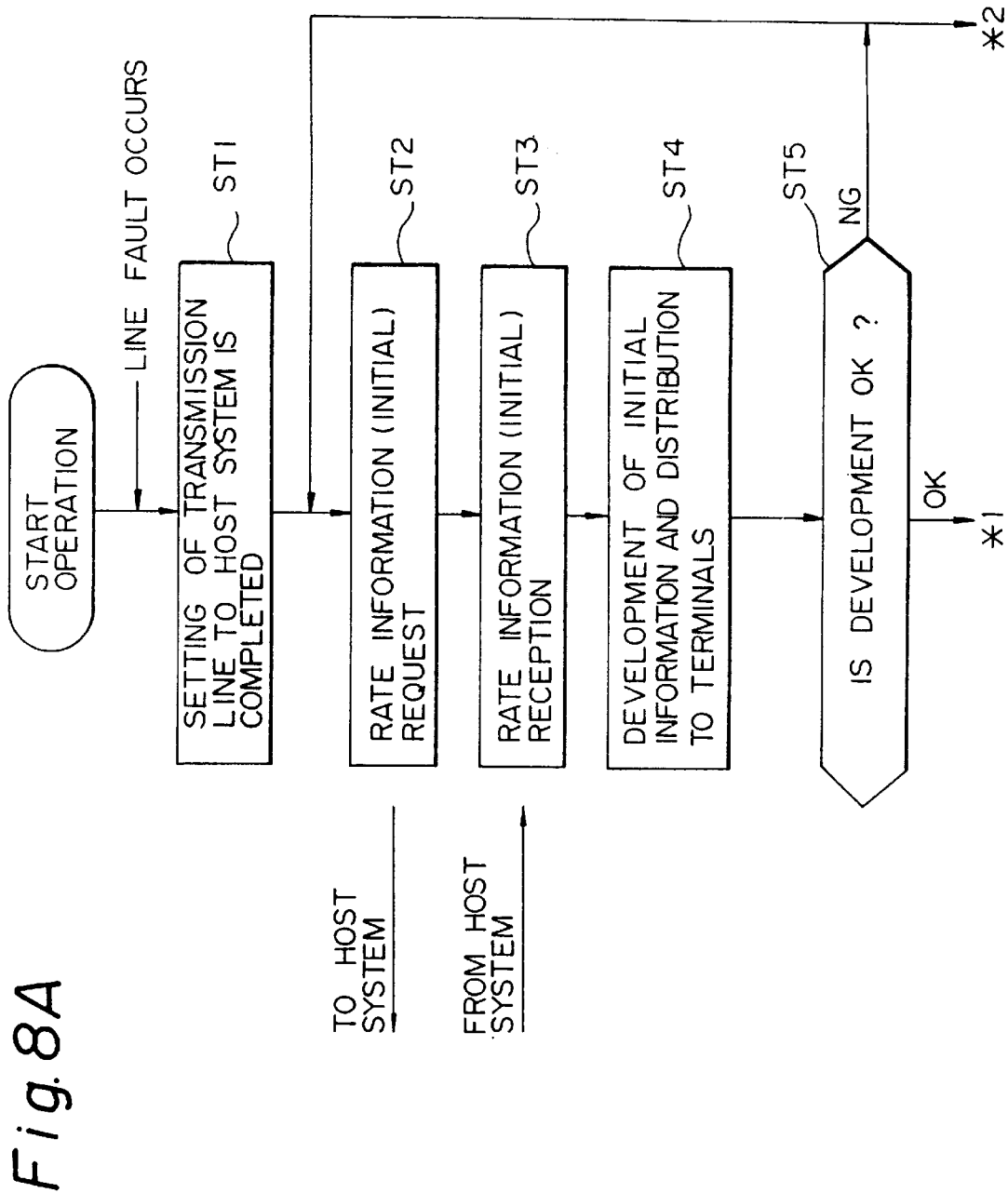
FIGS. 8A and 8B show an embodiment of the flow of processing executed by a subscriber control unit.
Figure 8B:
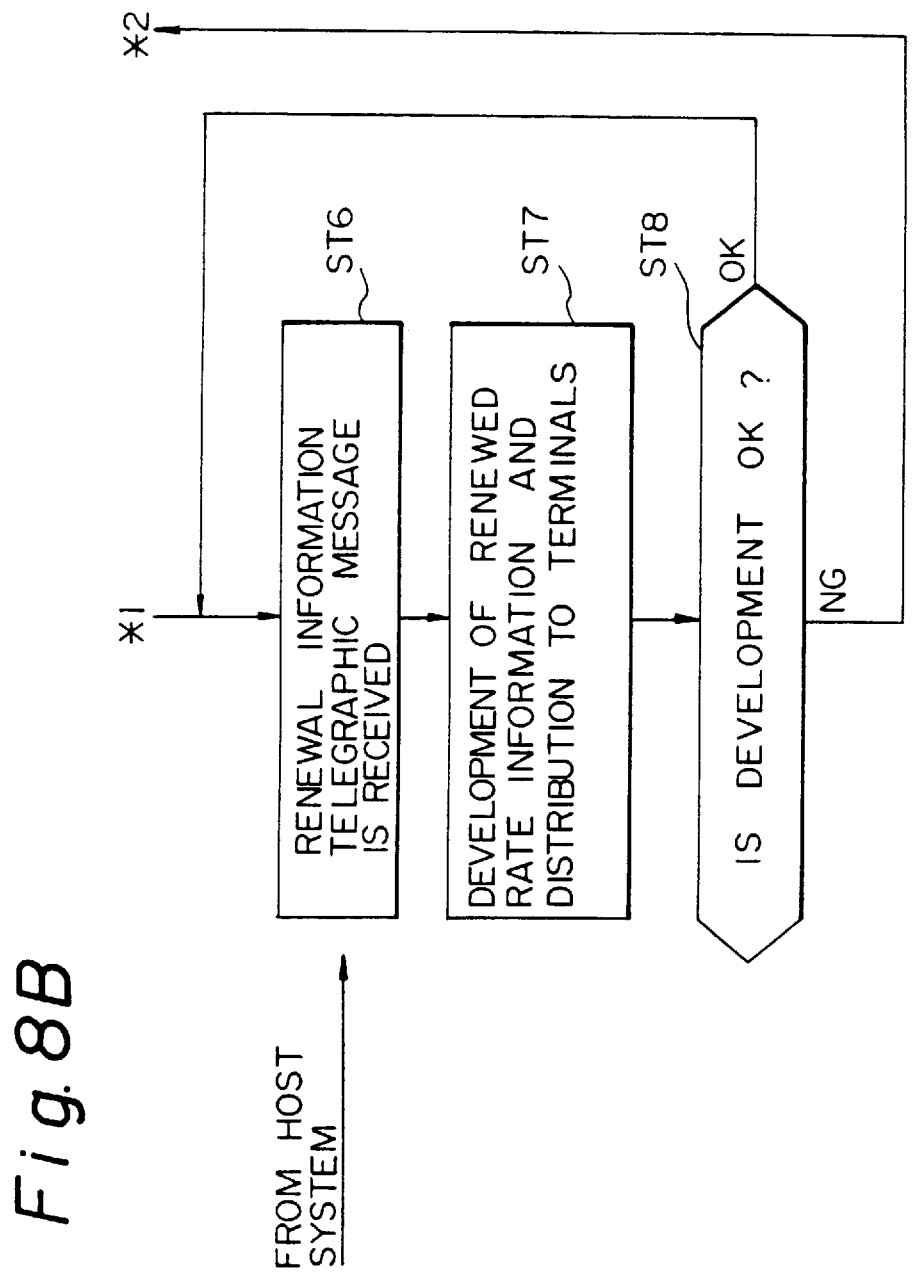

FIGS. 7A, 7B, and 7C illustrate an embodiment of the flow of processing executed by the rate information difference extraction process 44 of the host system 30, FIGS. 8A and 8B show an embodiment of the flow of overall processing executed by the subscriber control unit 34, and FIG. 9 shows an embodiment of the flow of processing executed by the rate information renewal process 62 of the subscriber control unit 34. Next, the operation of the embodiment will be explained in detail in accordance with these flows of processing.

In FIGS. 7A and 7B, when activated in a two second cycle from the difference extraction activation process 45, the rate information difference extraction process 44 of the host system 30 reads out at step 1 (ST1) the rate information found at the processing cycle of two seconds earlier from the copied rate file 50. Here, the read out rate information has the content of data shown in FIG. 3 (having a five-row structure in the example of FIG. 3). As explained later, correspondence is established with the frequency stored in the offered order change frequency file 49 at the time of registration.

Next, at step 2 (ST2), the frequency of the present processing cycle is read out from the offered order change frequency file 49. As explained above, the frequency managed by the offered order change frequency file 49 is provided for each market and is incremented each time there is an inquiry for a transaction. Therefore, when the frequency managed by the offered order change frequency file 49 is incremented, it means that there is a possibility of a fluctuation occurring in the rate information due to a transaction being established.

Next, at step 3 (ST3), it is judged if the frequency corresponding to the rate information read out at step 1 and the frequency read out at step 2 match, thereby judging if there is a market with the possibility of a change in the rate information between the preceding processing cycle and the present processing cycle. If it is judged at step 3 that the two frequencies match, that is, when it is judged that there is no market with the possibility of a change having occurred in the rate information between the preceding processing cycle and the present processing cycle, the rate information listed on the rate information bulletin board 61 of the subscriber control unit 34 shows the present information, so the processing is ended with nothing being done.

On the other hand, when it is judged at step 3 that the two frequencies do not match, that is, when it is judged that there is a market with the possibility of a change having occurred in the rate information between the preceding processing cycle and the present processing cycle, the routine proceeds to step 4 (ST4), where the rate information at the point of time of the present processing cycle of the market is read out from the rate information file 51. Next, at step 5 (ST5), the rate information of the preceding processing cycle read out at step 1 and the rate information of the present processing cycle read out at step 4 are compared in units of rows and a judgement made as to if the two match.

When it is judged at step 5 that the two rate informations completely match, it means that there has been no change in the rate information between the precedings processing cycle and the present processing cycle, so the rate information listed on the rate information bulletin board 61 in the subscriber control unit 34 shows the present information and therefore the processing is ended without anything being done. On the other hand, when it is judged at step 5 that the two rate informations do not completely match, it means that there has been a change in the rate information between the preceding processing cycle and the present processing cycle, so the routine proceeds to step 6 (ST6), where the processing for extraction of the difference between the two rate informations is executed. A renewal information telegraphic message displaying the different information is prepared and sent to the subscriber control unit 34.

Finally, at step 7 (ST7), the rate information of the present processing cycle read out from the rate information file 51 is written in the copied rate file 50 and the processing is ended. At this time, the frequency managed by the offered order change frequency file 49 is written in corresponding to the rate information.

In this way, when activated at 2 second cycles, the rate information difference extraction process 44 of the host system 30 prepares a renewal information telegraphic message displaying the information on the difference between the rate information at the time of the preceding processing cycle, stored in the copied rate file 50, and the rate information at the time of the present processing cycle, stored in the rate information file 51, and sends the same to the subscriber control unit 34.

FIGS. 7A and 7B are flow charts for the processing corresponding to the mode of the above-mentioned I) (and the mode of II)). The flow chart corresponding to the mode of III) is shown by FIGS. 7A and 7C. The steps of FIG. 7A have already been explained, so the explanation here will be made of steps 6, 7, 8, 9, and 10 in FIG. 7C. Note that the last step 10 (ST10) in FIG. 7C is exactly the same as the step 7 (ST7) of FIG. 7B. At the step 6 (ST6) of FIG. 7C, the difference between the two rate informations is extracted. At step 7 (ST7), it is investigated which are more numerous: records to remain as is as valid data and records to be invalidated as invalid data. The routine proceeds to step 8 (ST8) or step (ST9) in accordance with their magnitudes.

Before explaining FIGS. 8A, 8B, and 9, an explanation will be made of an example of a renewal information telegraphic message prepared by the rate information difference extraction process 44 with reference to FIG. 10. Here, in the renewal information telegraphic message, the rate information shown in FIG. 3 is envisioned.

In the renewal information telegraphic message of this embodiment, the type of the market is allocated to the frame header, the type of the transaction, showing whether it is a sale or a purchase, is allocated, row numbers of the valid records to remain as is as valid data even in the present processing cycle (expressed by row number of preceding rate information) are allocated, row numbers serving as the new loading locations of the valid records (expressed by row numbers of present rate information) are allocated, and insertion records (comprised of price, amount, and party) consisting of the content of the records which will constitute the new rate information are allocated in the order of closest proximity to the best rate.

Note that to start up or restart the subscriber control unit 34, it is necessary to list the rate information at the time of the present processing cycle in the rate information bulletin board 61 of the subscriber control unit 34, but at this time, the rate information difference extraction process 44 transfers a telegraphic message for initializing processing, corresponding to a renewal information telegraphic message having the data structure shown in FIG. 11 in response to the request for transfer of the rate information from the subscriber control unit 34 and thereby sends all the rate information of that time to the subscriber control unit 34.

Next, a detailed explanation will be given on the processing executed by the subscriber control unit 34 in accordance with the flow of processing of FIGS. 8A and 8B and FIG. 9.

When the operation starts, the subscriber control unit 34, as shown by the flow of processing of FIGS. 8A and 8B, first sets up a line with the host system 30 at step 1 (ST1). When the line has finished being set up, then at step 2 (ST2) it issues a request for transfer of rate information to the host system 30. Then, at step 3 (ST3), it receives the rate information from the host system 30 transmitted in response to the request for transfer of step 2. That is, by receiving the initializing processing use telegraphic message shown in FIG. 11, the rate information at that time is received.

Next, at step 4 (ST4), it writes the received rate information in the rate information bulletin board 61 and distributes the rate information to the terminals connected to the system. Then, at step 5 (ST5), it confirms that the rate information has been normally developed, then the routine proceeds to step 6 (ST6) of FIG. 8B, where the unit receives the renewal information telegraphic message shown in FIG. 10, sent from the host system 30. Then, at step 7 (ST7), it writes the rate information of the present time in the rate information bulletin board 61 in accordance with the received renewal information telegraphic message and distributes the rate information to the terminals connected to the system.

Further, at the next step 8 (ST8), when it is confirmed that the rate information has been normally developed, the routine returns to step 6, where the latest rate information is written in the rate information bulletin board 61 and the rate information is distributed to the terminals connected to the unit concerned. Note that when it is confirmed at step 5 and step 8 that the rate information has been normally developed, the routine returns to the processing of step 2 in both cases.

The processing of step 7 of the flow of processing of FIG. 8B, specifically, corresponds to execution of the flow of processing of FIG. 9 by the rate information changing process 62 of the subscriber control unit 34.

That is, when receiving the renewal information telegraphic message, the rate information renewal process 62 of the subscriber control unit 34, as shown in the flow of processing of FIG. 9, first judges at step 1 (ST1) if it is a normal telegraphic message. When a normal telegraphic message, at the next step 2 (ST2), it specifies the valid record row numbers displayed by the received renewal information telegraphic message and clears the records other than the records indicated by the valid record row numbers out of the records of rate information managed by the rate information bulletin board 61.

Next, step 3 (ST3), it specifies the record loading row number displayed by the received renewal information telegraphic message and shifts the records indicated by the specified valid record row numbers to the row positions indicated by the record loading row numbers. Next, at step 4 (ST4), it specifies the insertion records displaying the received renewal information telegraphic message and develops the offered order records shown by the insertion record in empty records of the rate information in the rate information bulletin board 61 in order. Next, at step 5 (ST5), only the rate information of markets where loading processing has been performed is edited. At the next step 6 (ST6), the rate information is distributed to the terminals connected to the system and the processing is ended.

In this way, the rate information renewal process 62 of the subscriber control unit 34 prepares the latest rate information from the renewal information telegraphic message transferred from the host system 30 and the rate information managed by the rate information bulletin board 61 and lists the same in the rate information bulletin board 61.

Figure 12:
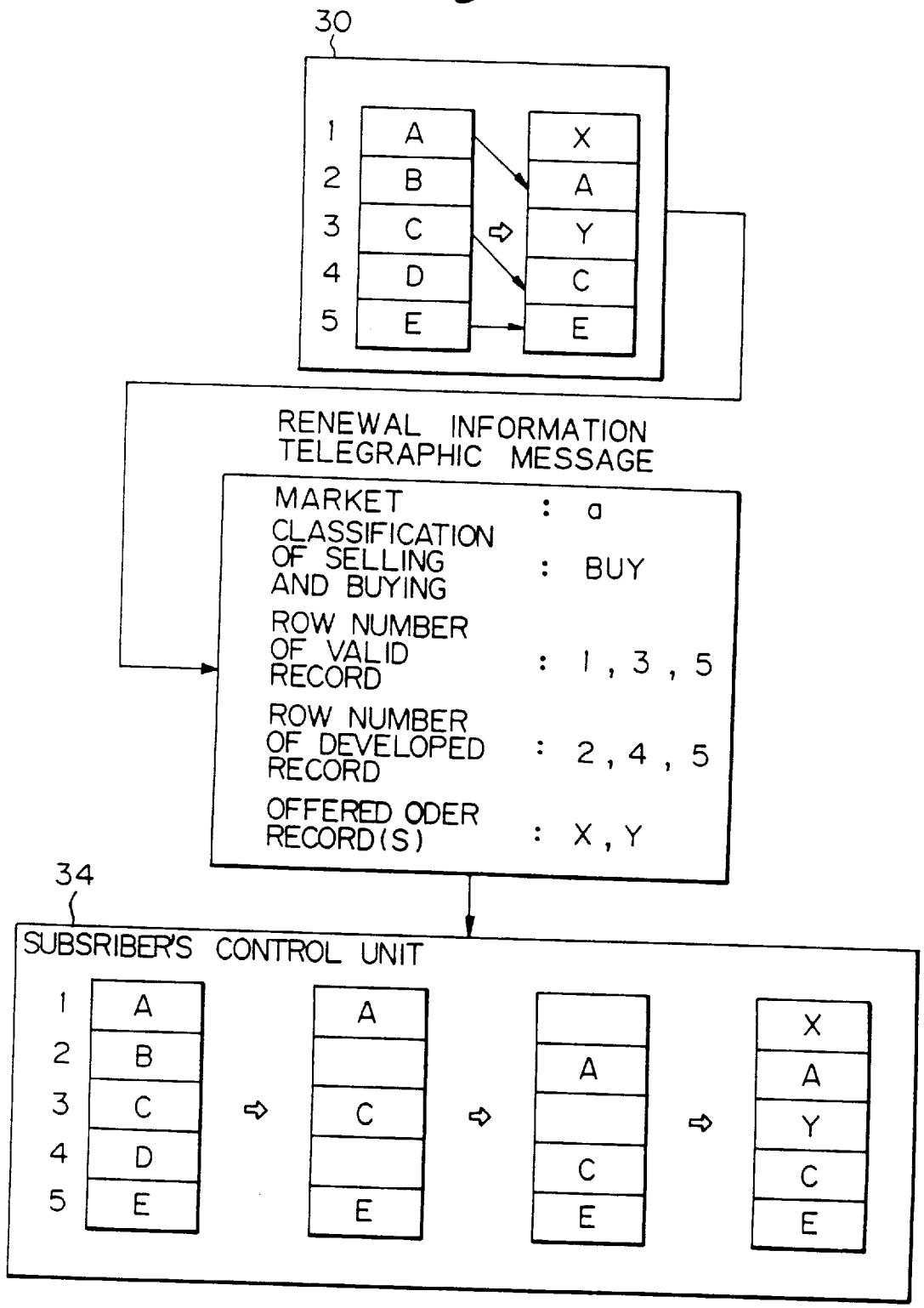
FIG. 12 is a view explaining the processing for transfer of rate information.

FIG. 12 illustrates an example of the processing for transfer of rate information according to this embodiment.

In this example, when rate information comprised of "A, B, C, D, and E" changes to "X, A, Y, C, and E", the host system 30 prepares a renewal information telegraphic message having the valid record row numbers of the series of "1, 3, and 5", the record loading row numbers of "2, 4, and 5", and the insertion records of "X, Y" and transfers it to the subscriber control unit 34. When this renewal information telegraphic message is received, the subscriber control unit 34 clears "B and D" in the rate information of "A, B, C, D, and E" listed on the rate information bulletin board 61, then moves A to the second row, C to the fourth row, and E to the fifth row position, then loads the X of the insertion record at the empty record position of the first row and loads the Y of the insertion code in the empty record position of the third row, thereby transferring the rate information. Referring to FIG. 3, a transaction corresponding to "B and D" is approved and these are then erased.

While the explanation was made with respect to the illustrated embodiments, the present invention is not limited to them. For example, in the embodiments, the disclosure was made using the example of application to an electronic dealing system, but the present invention is not limited to this.

Further, in the embodiment, the invention was disclosed in accordance with a construction where the valid record position information is loaded as a renewal information telegraphic message, but the present invention is not limited to this. It may also be constructed to load the invalid record position information. Further, to reduce the amount of the transferred data, it is also possible to load the valid record position information or the invalid record position information, whichever is smaller, in the renewal information telegraphic message.

Further, in the embodiment, the invention was disclosed in accordance with the processing for transfer of data information with a one-dimensional series of records, but the present invention is not limited to this and can also be applied as is to the processing for transfer of data information with a series of records of two or more dimensions.

As explained above, according to the present invention, when transferring continuously renewed data information disposed in a predetermined pattern from a transmission side system to a reception side system, the transmission side system may be made to just transfer the small amount of data of the record disposition information in addition to the renewed records and does not transfer records which are not renewed, so it is possible to tremendously reduce the amount of the transferred data itself and therefore to transfer data information at a high speed.

Further, the reception side system merely performs the simple processing of writing the renewed records transferred from the transmission side system in empty disposition locations in accordance with a prescribed order, so it is possible to greatly reduce the load.

We claim:

1. A data transfer processing system constructed so that a transmission side system transfers continuously renewed data information disposed in a prescribed data pattern to a reception side system, wherein said transmission side system is provided with:
specifying means for comparing the data information of before and after renewal and specifying records including data information to remain as-is as valid data even after renewal, and
transfer means for transferring pre-renewal disposition information, of the records specified by the specifying means indicating record disposition before the data of the record is renewed, and post-renewal disposition information, of the records specified by the specifying means indicating record disposition after the data of the record is renewed, to the reception side system and transferring the records changed by the renewal to the reception side system in accordance with a prescribed order; and wherein said reception side system is provided with:
invalidating means for invalidating records other than the records indicated by the pre-renewal disposition information transferred from the transfer means,
changing means for rearranging the records not invalidated by the invalidating means at disposition locations indicated by the post-renewal disposition information transferred from the transfer means, and
writing means for writing the records transferred from the transfer means in empty disposition locations in accordance with a prescribed order.

2. A data transfer processing system as set forth in claim 1, wherein said transfer means of said transmission side system transfers all of the latest data information to the reception side system in response to a request for transfer from the reception side system.

3. A data transfer processing system continuously renewing and transferring data information disposed in a prescribed data pattern from a transmission side to a reception side comprising:

a transmission side system provided with:
specifying means for comparing the data information of before and after renewal and for specifying records including a subset of the data information to remain as-is as valid data even after the renewal, and
transfer means for transferring pre-renewal disposition information, of the records specified by said specifying means indicating record disposition before data of the record is renewed, and post-renewal disposition information, of the records not specified by said specifying means indicating record disposition after the data of the record is renewed, to the reception side and transferring the records changed by the renewal to the reception side in accordance with a prescribed order; and a reception side system provided with:
invalidating means for invalidating records indicated by the pre-renewal disposition information transferred from said transfer means,
changing means for rearranging the records not invalidated by said invalidating means at disposition locations indicated by the post-renewal disposition information transferred from said transfer means, and
writing means for writing the records transferred from said transfer means in empty disposition locations in accordance with a prescribed order.

4. A data transfer processing system as set forth in claim 3, wherein said transfer means of said transmission side system transfers all of the latest data information to the reception side system in response to a request for transfer from the reception side system.

5. A data transfer processing system constructed so that a transmission side system transfers continuously renewed data information disposed in a prescribed data pattern to a reception side system, wherein said transmission side system is provided with:
specifying means for comparing the data information of before and after renewal, specifying records including data information to remain as-is as valid data even after renewal and records including data information to become invalid data after renewal, and specifying which of the records are fewer in number; and
transfer means for transferring to the reception side system pre-renewal disposition information, of the records indicating disposition of the records before renewal and specified by the specifying means as being fewer and discrimination information displaying whether the records are valid data or invalid data, transferring to the reception side system post-renewal disposition information of the records specified by the specifying means as valid data indicating disposition of the records after renewal, and transferring to the reception side system records changed by the renewal in accordance with a prescribed order; and wherein said reception side system is provided with:
invalidating means for invalidating records other than the records indicated by the pre-renewal disposition information out of the records of data information managed when pre-renewal disposition information having discrimination information displaying that the data is valid data is transferred from the transfer means or invalidating records indicating by the pre-renewal disposition information out of the records of data information having discrimination information displaying that the data is invalid data is transferred from the transfer means,
changing means for rearranging the records not invalidated by the invalidating means at disposition locations indicated by the post-renewal disposition information transferred from the transfer means, and
writing means for writing the records transferred from the transfer means in empty disposition locations in accordance with a prescribed order.

6. A data transfer processing system as set forth in claim 5, wherein said transfer means of said transmission side system transfers all of the latest data information to the reception side system in response to a request for transfer from the reception side system.

7. A method of transferring continuously updated data, comprising:
generating update data providing data updates;
indicating data remaining valid after an update using pre-update information;
identifying data remaining unchanged and valid after the update using post-update information; and
transferring the pre-update information, the post-update information and update data.

8. An apparatus for transferring continuously updated data, comprising:
an update unit generating update data providing data updates;

a valid data specification unit indicating data remaining valid after an update using pre-update information;

an unchanged data specification unit identifying data remaining unchanged and valid after the update using post-update information; and a transfer unit transferring the pre-update information, the post-update information and the update data.

9. A method of receiving continuously updated data, comprising:

receiving pre-update information indicating data remaining valid after an update, post-update information identifying data remaining unchanged and valid after the update, and update data providing data updates;

invalidating data other than the data indicated by the pre-update and post-update information; and updating the data with the update data.

10. An apparatus for receiving continuously updated data, comprising:

a receiver receiving pre-update information indicating data remaining valid after an update, post-update information identifying data remaining unchanged and valid after the update, and update data providing data updates;

an invalidating unit invalidating data other than the data indicated by the pre-update and post-update information; and an updating unit updating the data with the update data.

11. A method of transferring and updating continuously updated data, comprising:

generating update data providing data updates;

indicating data remaining valid after an update using pre-update information;

identifying data remaining unchanged and valid after the update using post-update information;

transferring the pre-update information, the post-update information and update data;

receiving the pre-update information, the post-update information and the update data;

invalidating data other than the data indicated by the pre-update and post-update information; and updating the data with the update data.

* * * * *

UNITED STATES PATENT AND TRADEMARK OFFICE
CERTIFICATE OF CORRECTION

PATENT NO.   : 5,862,176
DATED        : Jan. 19, 1999
INVENTOR(S)  : Hideyo Midorikawa, et al It is certified that error appears in the above-identified patent and that said Letters Patent is hereby corrected as shown below:

On the title page, [73] Assignee, change "Kanagawa" to --Kawasaki--.

Col. 1,    line 15, change "update" to --updated--;
           line 19, change "update" to --updated--.

Col. 11,   lines 4-32, delete claim 1 in its entirety and substitute therefore the following:

1.    A data transfer processing system continuously renewing and transferring data information disposed in a prescribed data pattern from a transmission side to a reception side, comprising:

a transmission side system provided with:

specifying means for comparing the data information of before and after renewal and for specifying records including a subset of the data information to remain as-is as valid data even after the renewal, and transfer means for transferring pre-renewal disposition information, of the records specified by said specifying means indicating record disposition before data of the record is renewed, and post-renewal disposition information, of the records specified by said specifying means indicating record disposition after the data of the record is renewed, to the reception side and transferring the records changed by the renewal to the reception side in accordance with a prescribed order; and a reception side system provided with:

invalidating means for invalidating records other than the records indicated by the pre-renewal disposition information transferred from said transfer means,

UNITED STATES PATENT AND TRADEMARK OFFICE
CERTIFICATE OF CORRECTION

PATENT NO. : 5,862,176
DATED : Jan. 19, 1999
INVENTOR(S) : Hideyo Midorikawa, et al It is certified that error appears in the above-identified patent and that said Letters Patent is hereby corrected as shown below:

changing means for rearranging the records not invalidated by said invalidating means at disposition locations indicated by the post-renewal disposition information transferred from said transfer means, and writing means for writing the records transferred from said transfer means in empty disposition locations in accordance with a prescribed order.

Col. 12, lines 6-48, delete claim 5 in its entirety and substitute therefore the following:

5. A data transfer processing system continuously renewing and transferring data information disposed in a prescribed data pattern from a transmission side to a reception side, comprising:
a transmission side system provided with:

specifying means for comparing the data information of before and after renewal, for specifying first records including first data information to remain as-is as valid data even after the renewal and second record including second data information to become invalid data after the renewal, and for specifying least records corresponding to those of the first and second records which are fewer in number; and transfer means for transferring to the reception side pre-renewal disposition information of the least records indicating disposition of the least records before the renewal and discrimination information indicating whether the least records are valid data or invalid data, for transferring to the reception side post-renewal disposition information of valid records, specified by said specifying means as containing valid data, indicating disposition of the valid records after the renewal, and for transferring to the reception side modified records changed by the renewal in accordance with a prescribed order; and

UNITED STATES PATENT AND TRADEMARK OFFICE
CERTIFICATE OF CORRECTION

PATENT NO.   : 5,862,176
DATED        : Jan. 19, 1999
INVENTOR(S)  : Hideyo Midorikawa, et al It is certified that error appears in the above-identified patent and that said Letters Patent is hereby corrected as shown below:

a reception side system provided with:

invalidating means for invalidating the second records on the reception side not indicated by the pre-renewal disposition information when the discrimination information indicates that valid data is transferred from said transfer means and for invalidating the second records on the reception side indicated by the pre-renewal disposition information when the discrimination information indicates that invalid data is transferred from said transfer means, changing means for rearranging the first records on the reception side not invalidated by said invalidating means at disposition locations indicated by the post-renewal disposition information transferred from said transfer means, and writing means for writing new records transferred from said transfer means in empty disposition locations in accordance with a prescribed order.

Col. 12,    line 63, after "and" insert --the--.

Signed and Sealed this

Seventh Day of September, 1999

Attest:

Q. TODD DICKINSON

*Attesting Officer*

Acting Commissioner of Patents and Trademarks